US012497863B2

(12) United States Patent
Buck et al.

(10) Patent No.: US 12,497,863 B2
(45) Date of Patent: Dec. 16, 2025

(54) LIFT-READY FLOWHEAD ASSEMBLY (71) Applicant: M & M Oil Tools, LLC, Breaux Bridge, LA (US)

(72) Inventors: David A. Buck; Andy Paul Todd, Lafayette, LA (US); Jeffery Daigle, Lafayette, LA (US); Brad Indest, Breaux Bridge, LA (US)

(73) Assignee: M & M Oil Tools, LLC, Breaux Bridge, LA (US)

( * ) Notice: Subject to any disclaimer, the term of this patent is extended or adjusted under 35 U.S.C. 154(b) by 0 days.

(21) Appl. No.: 17/904,406

(22) PCT Filed: Feb. 19, 2021

(86) PCT No.: PCT/US2021/018845
§ 371 (c)(1),
(2) Date: Aug. 17, 2022

(87) PCT Pub. No.: WO2021/168296
PCT Pub. Date: Aug. 26, 2021

(65) Prior Publication Data
US 2023/0064016 A1 Mar. 2, 2023

Related U.S. Application Data (60) Provisional application No. 62/978,472, filed on Feb. 19, 2020.

(51) Int. Cl.
*E21B 41/00* (2006.01)
*B66C 1/62* (2006.01)
(Continued)

(52) U.S. Cl.
CPC .............. *E21B 41/00* (2013.01); *E21B 33/03* (2013.01); *E21B 34/02* (2013.01); *B66C 1/62* (2013.01); *E21B 2200/04* (2020.05)

(58) Field of Classification Search
CPC ........ E21B 33/03; E21B 33/06–33/063; B66C 1/62; B66C 1/66
See application file for complete search history.

(56) References Cited

U.S. PATENT DOCUMENTS 3,675,278 A * 7/1972 Powell ................... E21B 19/07
294/102.2
4,834,441 A * 5/1989 Schivley ................. E21B 19/06
294/90

(Continued)

FOREIGN PATENT DOCUMENTS

GB 343162 A 2/1931

OTHER PUBLICATIONS

"BOP" non-patent literature from the Schlumberger Oilfield Glossary as it appeared in 2017, accessed via web.archive.org (Year: 2017).*

(Continued)

*Primary Examiner* — Blake Michener
(74) *Attorney, Agent, or Firm* — Jones Walker LLP (57) ABSTRACT A lift-ready flowhead assembly which is generally formed of a flowhead assembly, a lifting yoke, and a lift sub. The flowhead assembly includes (i) a flowhead body having body threads and a side entry port, (ii) a swivel housing, (iii) a load collar tube rotatively supported in the swivel housing by a bearing assembly, and (iv) a ball valve positioned in said flowhead body and configured to block and unblock a central passage running through the load collar tube and the flowhead body. The lifting yoke includes (i) a yoke body having a center aperture, and (ii) opposing pad-eyes extending from the yoke body. The lift sub includes (i) a head section, (ii) a neck section having external neck threads, and (iii) a sub passage extending through the head and neck sections. The neck section of the lift sub extends through the center aperture of the yoke body and the neck threads engage (Continued)

the body threads of the flowhead body, thereby securing the lifting yoke to the flowhead assembly.

17 Claims, 12 Drawing Sheets

(51) Int. Cl.
*E21B 33/03* (2006.01)
*E21B 34/02* (2006.01)

(56) References Cited

U.S. PATENT DOCUMENTS

| | | | | |
|---|---|---|---|---|
| 4,951,989 A * | 8/1990 | Goodin | ............... | B66C 1/62 294/90 |
| 5,954,378 A * | 9/1999 | Forgue | ............... | B66C 1/62 294/67.1 |
| 6,488,094 B1 * | 12/2002 | McDowell | ............ | E21B 21/106 166/85.4 |
| 7,044,216 B2 * | 5/2006 | Otten | ............... | E21B 19/084 294/90 |
| 7,497,268 B1 * | 3/2009 | Zeni | ............... | E21B 19/06 294/90 |
| 9,488,033 B2 * | 11/2016 | Buck | ............... | F16K 5/201 |
| 10,502,022 B1 * | 12/2019 | Buck | ............... | E21B 21/10 |
| 2004/0134666 A1 * | 7/2004 | Orr | ............... | E21B 19/002 166/85.1 |
| 2006/0113087 A1 | 6/2006 | Springett et al. | | |
| 2006/0131023 A1 | 6/2006 | Jacklin | | |
| 2008/0135228 A1 * | 6/2008 | Wells | ............... | E21B 19/16 166/85.1 |
| 2012/0085532 A1 | 4/2012 | McGuire | | |
| 2014/0265389 A1 * | 9/2014 | Orgeron | ............... | E21B 19/06 294/67.32 |
| 2015/0101821 A1 * | 4/2015 | Bridges | ............... | E21B 19/002 166/360 |
| 2015/0226026 A1 * | 8/2015 | Kent | ............... | E21B 33/06 166/85.4 |
| 2015/0308200 A1 * | 10/2015 | Williams | ............... | E21B 17/042 166/344 |
| 2015/0377409 A1 * | 12/2015 | Vogt | ............... | E21B 33/06 248/647 |
| 2017/0335637 A1 * | 11/2017 | Nelsen | ............... | E21B 19/12 |
| 2018/0195361 A1 * | 7/2018 | Senger | ............... | E21B 33/03 |

OTHER PUBLICATIONS

Supplementary European Search Report dated Jan. 11, 2024, from Applicant's European Patent Application No. 21757899.

* cited by examiner

LIFT-READY FLOWHEAD ASSEMBLY

CROSS REFERENCE TO RELATED APPLICATIONS

Pursuant to 35 U.S.C. § 371, this application claims priority to International Application Number PCT/US2021/018845, filed on Feb. 19, 2021, which claims the benefit of U.S. Provisional Application No. 62/978,472, filed on Feb. 19, 2020, both of which are incorporated by reference herein.

BACKGROUND

Oil and gas drilling, production and completion systems typically employ a series of drilling, workover or intervention equipment components which create a continuous tubular passage between the top of the system and the well. These components can include a completion, drilling or workover riser, swivels, a surface tree, a coiled tubing injector, and even surface blowout preventers (BOPs) in some configurations. And while different components can add functionality to the operations performed, this additional functionality comes at the cost of increasing the stack-up height of surface equipment, which must be accounted for in available distance between the drill floor and the top of the system (e.g., the top drive). The increased stack-up height of the surface equipment generally requires taller, heavy, more costly derricks. Increased stack-up height may also reduce an operator's capability to rig up and run equipment simultaneously which may limit the types of operations which may be carried out before it becomes necessary to rig up again with different equipment.

Additionally, assembling the various drilling, workover or intervention equipment components into the surface string or system is both time consuming and may require special equipment to safely position these components during assembly. This is particularly problematic in offshore drilling operations where rig time and space for storing special equipment are both at a premium. Therefore, shortening the surface components provides a solution to the problem of achieving the most functionality possible for a given stack-up height. Similarly, components which allow a more completely assembled drilling, workover or intervention surface system (i.e., assembled onshore and transported as a complete unit to the offshore rig) to be quickly positioned in the draw works offshore, provides a solution to the problem of time lost due to extensive and repeated rig up requirements.

SUMMARY OF SELECTED EMBODIMENTS OF THE INVENTION

One embodiment of the invention is a lift-ready flowhead assembly which is generally formed of a flowhead assembly, a lifting yoke, and a lift sub. The flowhead assembly includes (i) a flowhead body having body threads and a side entry port, (ii) a swivel housing, (iii) a load collar tube rotatively supported in the swivel housing by a bearing assembly, and (iv) a ball valve positioned in said flowhead body and configured to block and unblock a central passage running through the load collar tube and the flowhead body. The lifting yoke includes (i) a yoke body having a center aperture, and (ii) opposing pad-eyes extending from the yoke body. The lift sub includes (i) a head section, (ii) a neck section having external neck threads, and (iii) a sub passage extending through the head and neck sections. The neck section of the lift sub extends through the center aperture of the yoke body and the neck threads engage the body threads of the flowhead body, thereby securing the lifting yoke to the flowhead assembly.

Another embodiment of the invention is a method of suspending the above flowhead assembly from a drilling rig with a hoisting assembly. This includes providing the lift-ready flowhead assembly and then connecting the hoisting assembly to the pad-eyes on the yoke body.

A further embodiment of the invention is a lifting yoke which includes (i) a yoke body having a center aperture, the center aperture sized to allow a lift sub head section to pass through the center aperture; (ii) at least one block collar configured to have (1) a first position allowing the lift sub head section to pass through the center aperture, and (2) a second position retaining the lift sub head section within the yoke body; and (iii) opposing pad-eyes extending from the yoke body.

DETAIL DESCRIPTION OF SELECTED EMBODIMENTS OF THE INVENTION

Figure 1:
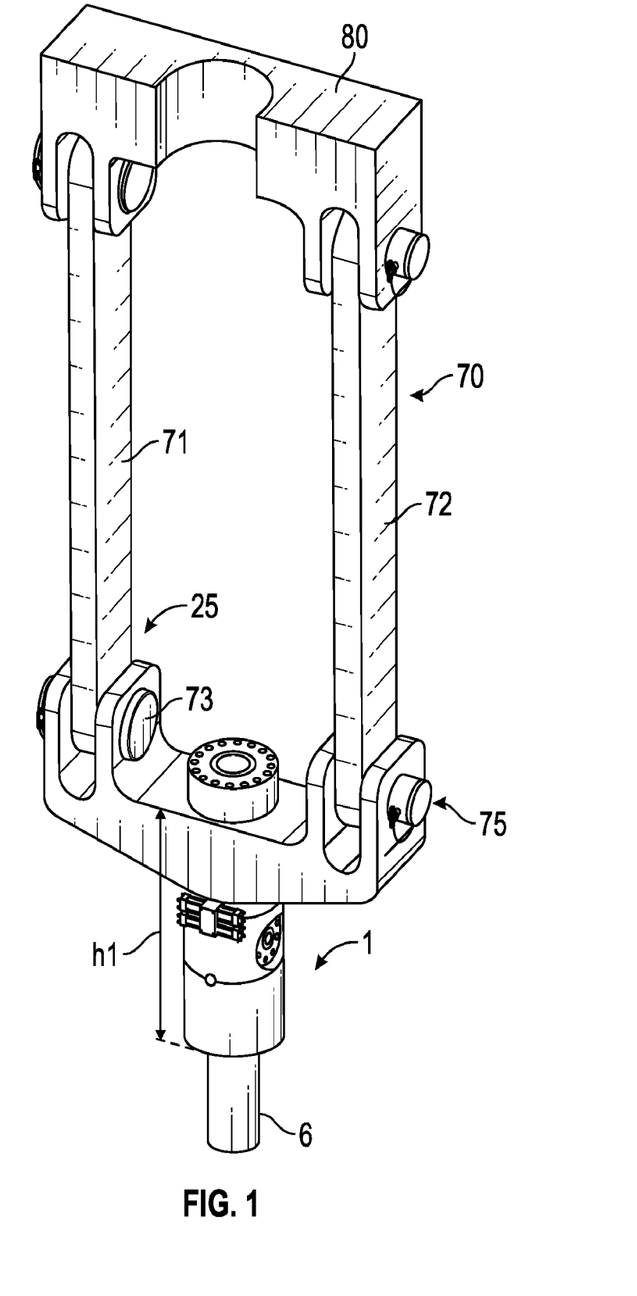
FIG. 1 is a perspective view of one embodiment of the lift-ready flowhead assembly connected to a lifting apparatus.
Figure 2:
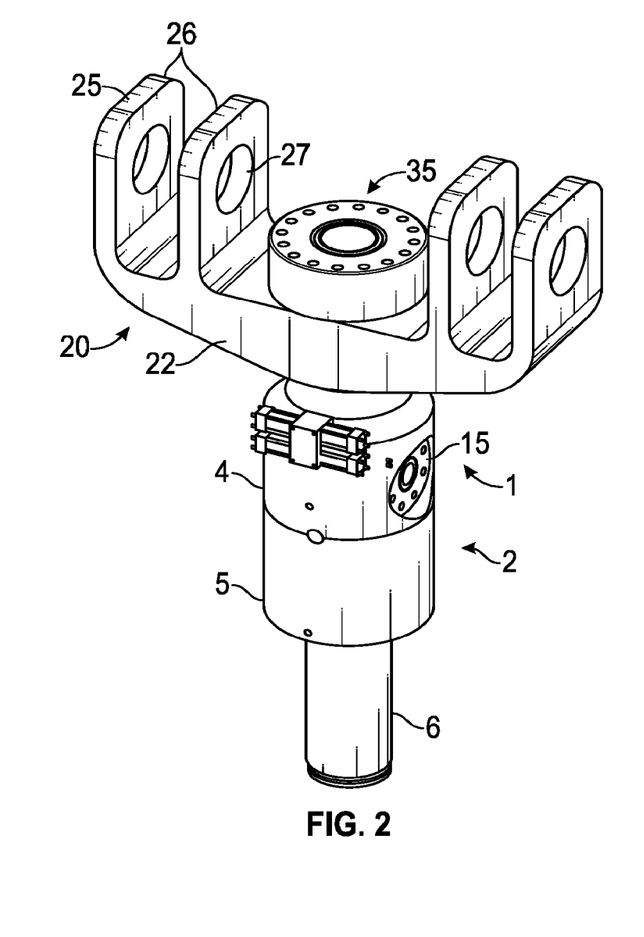
FIG. 2 is a perspective view of the FIG. 1 lift-ready flowhead assembly.
Figure 4:
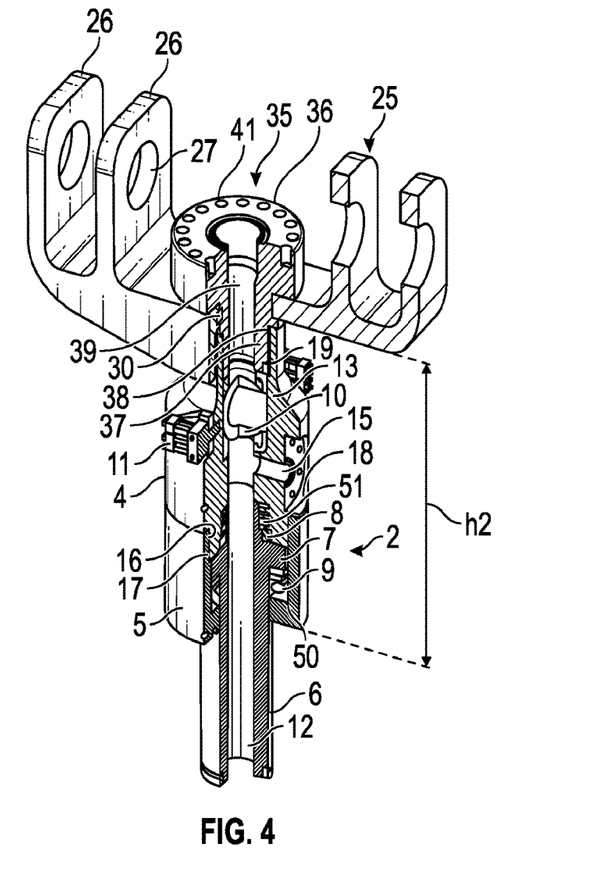
FIG. 4 is a partial cut-away view of the FIG. 2 embodiment.

FIGS. 1 and 2 illustrate one embodiment of the lift-ready flowhead assembly 1 of the present invention. Viewing FIG. 2, the main elements of this embodiment comprise the flowhead assembly 2, the lifting yoke 20, and the lift sub 35. The term "flowhead assembly" can describe many different flow-directing devices commonly used in the oil and gas industry, including surface safety valves and surface test trees. The flowhead assembly 2 is best understood viewing FIG. 4. The main housing of flowhead assembly 2 is formed by threads 16 of flowhead body 4 engaging the threads 17 on swivel housing 5. Positioned in swivel housing 5 is load collar tube 6 which includes collar section 7 and central passage 12 extending through load collar tube 6. The lower surface of collar section 7 will be supported by the lower bearing assembly 9 which in turn is resting on swivel housing internal shoulder or ledge 50. The upper surface of collar section 7 is constrained against upper bearing assembly 8 which in FIG. 4 is disposed inside bearing pocket 51 formed in flowhead body 4. As used herein, "above" or "upper" means the direction along the length of the tool toward lifting yoke 20 (or other lifting apparats) and "below" or "lower" means in the direction away from lifting yoke 20.

In the illustrated embodiment, the bearing assemblies are spherical roller thrust bearings such as available from SKF USA Inc. of Lansdale, PA. Spherical roller thrust bearings are formed of a shaft washer (for radial bearings often called the "inner ring"), a housing washer (for radial bearings often called the "outer ring"), asymmetrical rollers and a cage. Spherical roller thrust bearings are designed to take radial loads and heavy axial loads in one direction and are considered "self-aligning" since the asymmetrical (or cone-shaped) rollers tend to center the shaft washer. Because these bearings support loads in multiple directions, they may sometimes be referred to as multi-dimension bearings. Although not shown in detail in the Figures, these bearing assemblies typically do not directly engage the surface of collar section 7, but rather a spring spacer plate and belleville spring are positioned between the bearing assemblies and the surface of collar section 7. This arrangement allows the belleville springs to bias the load collar tube in an axial direction toward the flowhead body 4.

Also positioned within flowhead body 4 is the ball valve 10, which in the illustrated embodiment is a cartridge type ball valve such as seen in U.S. Pat. No. 9,488,033, which is incorporated by reference herein. In this example of the flowhead assembly, ball valve 10 is positioned between side entry port 15 and a neck portion 13 of flowhead body 4. More specifically, the ball valve cartridge extends at least partially into the neck portion 13 of the flowhead body. While the Figures illustrate cartridge type ball valves, other embodiments could utilized ball valves formed directly in the flowhead body (i.e., not formed as part of an insertable "cartridge," but with cavities for valve seats formed directly in the flowhead body). In the FIG. 4 embodiment, the lift sub neck section 37 engages the flowhead body 4 in a manner where the neck section secures the ball valve cartridge in the flowhead body 4. Ball valve 10 will operated to block and unblock central passage 12. Valve activator pistons 11 will function to turn the valve stem, thereby opening and closing ball valve 10. Side entry port 15 will provide a connection point for high pressure tubing and thereby provide addition and/or alternative flow paths through the flowhead assembly.

The FIG. 4 embodiment also illustrates the compact arrangement of components contributing to the reduced overall length of the flowhead assembly. It can be seen that side entry port 15 includes an inset area 18 formed into the outer surface of flowhead body 4 (also referred to as "outer face inset" 18). FIG. 4 shows how the lower end of the ball valve cartridge 10 (or a non-cartridge ball valve) is formed or positioned behind a portion of the outer face inset 18. Similarly, the upper end of the bearing pocket 51 is positioned behind a portion of the outer face inset 18. However, other embodiments do not require a portion of the valve cartridge or the bearing pocket be directly behind outer face insert 18. In these other embodiments, it is sufficient if the lower end of the ball valve cartridge 10 (or a non-cartridge ball valve) is within 12" of the side entry port 15 (i.e., any portion of the outer face insert 18) and the upper end of the bearing pocket is within 12" of the side entry port 15.

Figure 3:
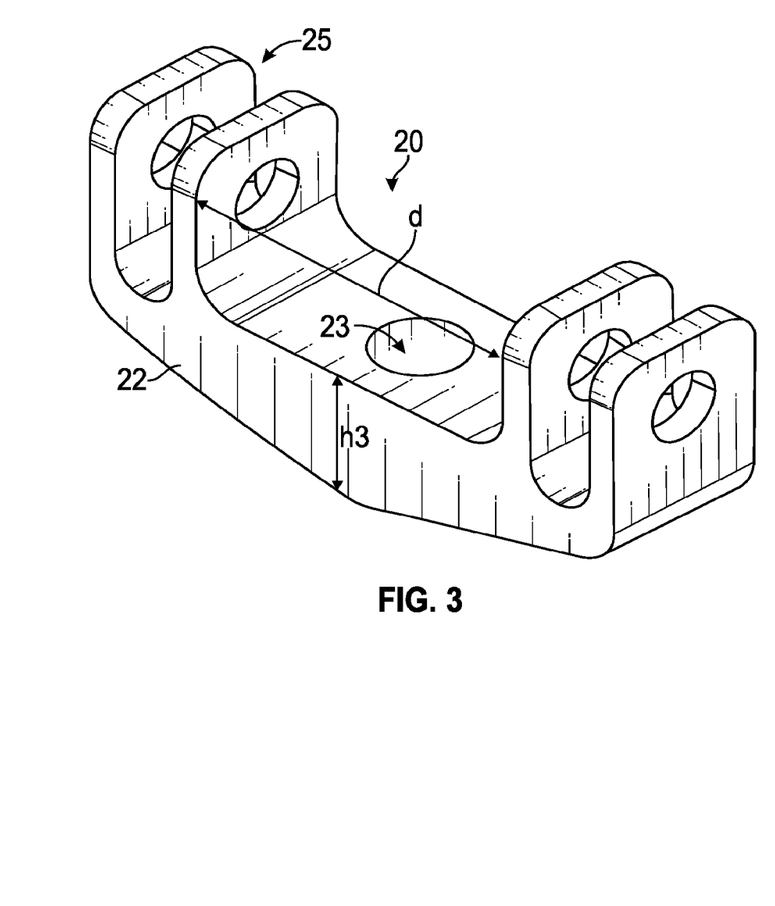
FIG. 3 is a perspective view of one embodiment of the lifting yoke.
Figure 5:
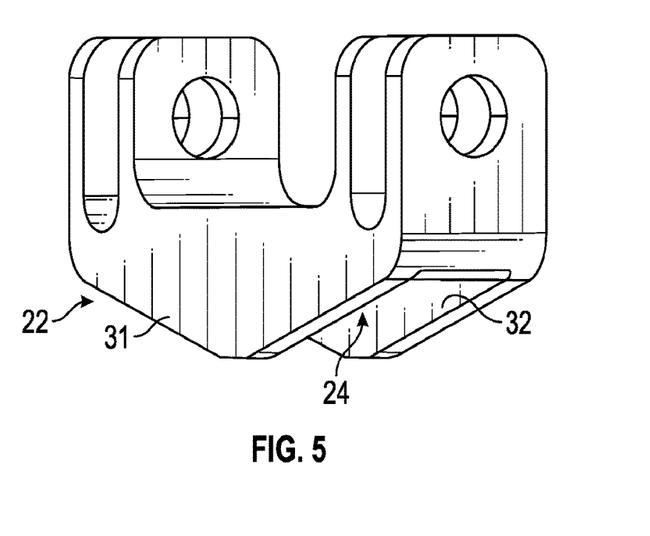
FIG. 5 is an alternate view of the FIG. 3 lifting yoke.
Figure 6A:
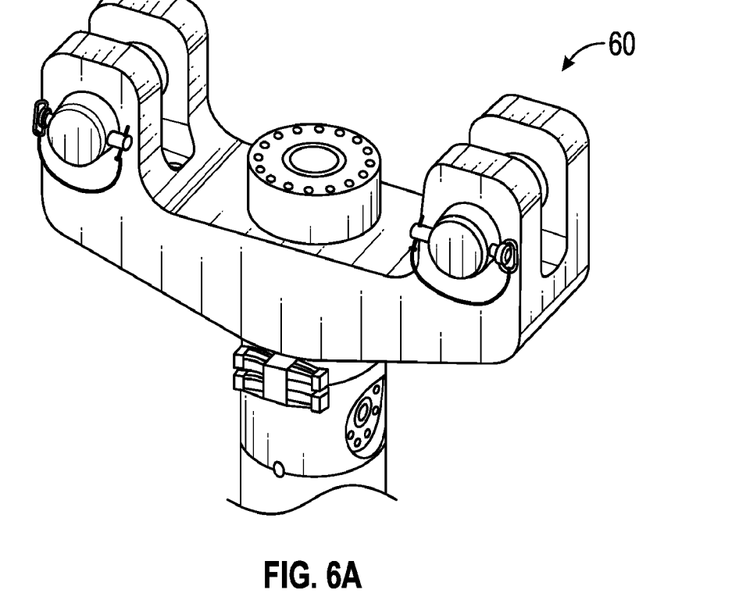
FIGS. 6A to 6D are alternative pad-eye embodiments.
Figure 6B:
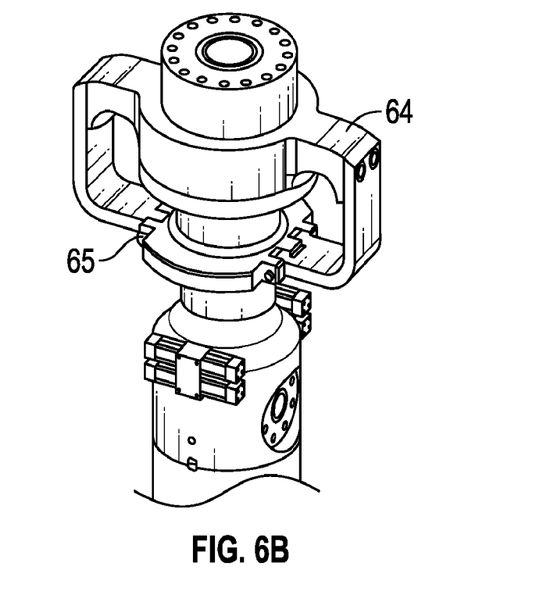
Figure 6C:
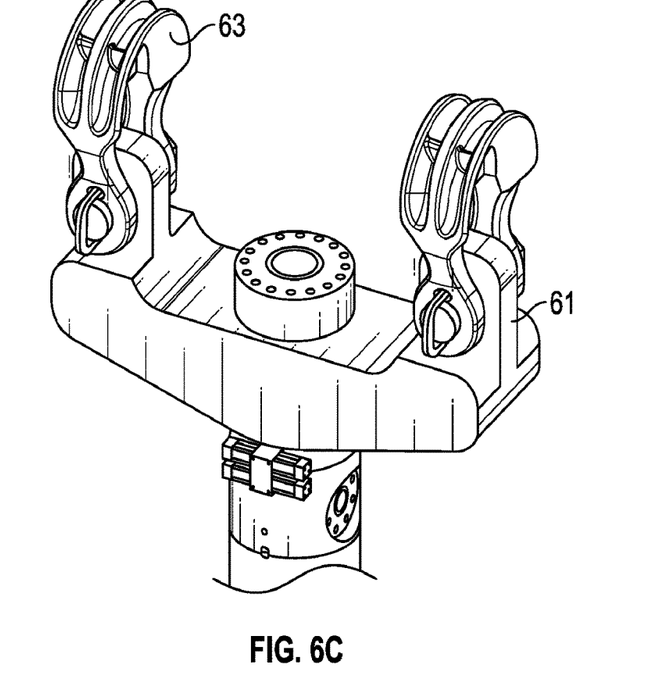
Figure 6D:
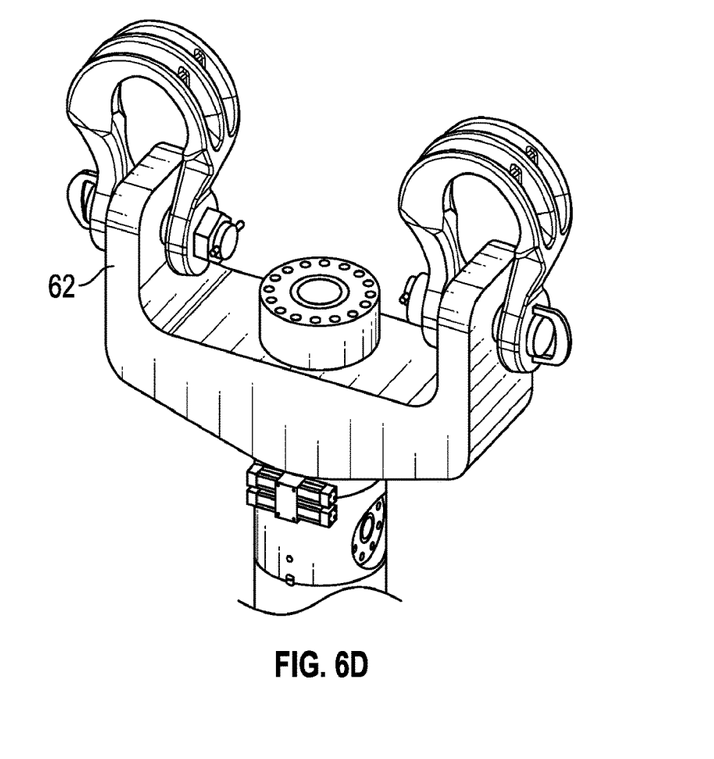

Viewing FIG. 3, the lifting yoke 20 generally comprises the yoke body 22 having the center aperture 23 together with the opposing pad-eyes 25 extending from the yoke body 22. As best seen in FIG. 5, the underside of yoke body 22 includes the recess 24 formed between the front wall 31 and rear wall 32 of yoke body 22. Front and rear walls 31/32 slope inward and downward from the pad-eyes 25 in order to resist the bending moment caused by the substantial upward lifting force exerted on the pad-eyes during use. In certain embodiments, the distance or height "$h_3$" of front and rear walls 31/32 may be a distance less than about 12" to 48", with more common ranges a distance less than about 12" to 24". In the illustrated embodiment, the pad-eyes 25 each have two upturned ears 26 having pin apertures 27 formed through the upturned ears 26. In many embodiments, the distance "d" between the inner upturned ears 26 can be anywhere between 18" and 100". In preferred embodiments, lifting yoke 20 will have a lifting capacity of between about 75 and 750 tons (including any sub-range in between). In the illustrated embodiments, lifting yoke 20 is integrally formed of milled steel. However, other embodiments of lifting yoke 20 could be formed from a casting process, a forging process, or constructed from steel plates bolted or welded together (as described below). Whether integrally formed or formed of plates, the sidewalls of the yoke body will typically have no gate or side gate (e.g., as found in conventional pipe elevators) for providing access to the center aperture 23. FIG. 6A suggests how the pad-eyes may be forward facing pad-eyes 60. FIG. 6C shows how the pad-eyes may be forward-facing single-eared pad-eyes 61 or side-facing single-eared pad-eyes 62 in FIG. 6D. Both FIGS. 6C and 6D suggest how a clevis 63 may be employed to provide a connecting point for cables or other lifting mechanisms. FIG. 6B shows a further alternative where the lifting yoke is formed with a cylindrical body and elevator-type lifting ears which have pinned bottom connections 65.

Viewing FIG. 4, the third main component of lift-ready flowhead assembly 1 is the lift sub 35. Lift sub 35 generally includes head section 36 and neck section 37 with a sub passage 39 extending through lifting sub 35. Head section 36 includes a series of bolt apertures 41 for the securing of devices such as a coil tubing assembly for inserting coil tubing into the wellbore. Neck section 37 extends away from head section 36 and includes a series of neck threads 38 on its distal (lower) external surface. As suggested in FIG. 4, the neck threads 38 engage the flowhead body neck threads 19 on the inner surface of flowhead body neck portion 13. Thus, it will be understood that lifting yoke 20 is secured to flowhead assembly 3 by way of neck section 37 of lift sub 35 extending through yoke body center aperture 23 and engaging the flowhead body 4. The lift sub passage 39 communicates with and becomes part of central passage 12 extending through the entire tool assembly. The central passage 12 will typically have a diameter corresponding to one of the standard tubular inner diameters used in the oil and gas industry, ranging from 9" to 2⅞". In the FIG. 4 embodiment, the flowhead body neck portion 13 will either directly engage the bottom surface of yoke body 22, or engage an intermediate structure (e.g., a spacer formed from a section of tubing), such that yoke body 22 cannot shift up and down between lift sub head section 36 and flowhead body neck portion 13. However, there could also be alternative embodiments where there is sufficient room between lift sub head section 36 and flowhead body neck portion 13 such that some shifting of yoke body 22 is allowed.

FIG. 4 also suggests how an anti-rotation insert 30 may be positioned between the neck section 37 of lift sub 35 and the surface of aperture 23 extending through yoke body 22. This anti-rotation insert would function to prevent relative rotation between lifting yoke 20 and flowhead body 4. Anti-rotation insert 30 could take the form of a spline and groove formed between lift sub neck section 37 and yoke aperture 23, a pin extending through yoke body 22 into lift sub neck section 37, a set screw through yoke body 22 into lift sub neck section 37, or many other conventional or future developed techniques for limiting relative rotation. Additionally, in the illustrated embodiments, the length of neck section 37 of lift sub 35 is sufficiently short that a portion of the yoke body extends over a portion of the flowhead body. More specifically, the length of the lift sub neck section 37 results in the neck portion 13 of flowhead body 4 extending into the recess 24 of yoke body 22. However, there could be other embodiments where lift sub neck section 37 is sufficiently long that no portion of the flowhead body extends into recess 24 of yoke body 22.

In one example of the lift-ready flowhead assembly 1 in operation, FIG. 1 suggests the lift-ready flowhead assembly 1 could be suspended from a coil tubing lifting frame 70. The pad-eyes 25 attach to bails 71 and 72 of lifting frame 70 by way of load pins 73. The load pins are secured in the pad-eyes with the pin retainer assemblies 75. In FIG. 1, the pin retainer is a conventional cotter pin. The opposite ends of the bails 71 and 72 are attached upper bails support 80. Although not shown, it will be understood that lifting frame 70 will be suspended from a derrick or similar structure. Likewise not shown in FIG. 1 is a tubing string suspended from load tube load collar tube 6 via a valve sub, a tubing adapter sub, or other device. Naturally, coil tubing lifting frame 70 is merely one example of deploying lift-ready flowhead assembly 1 in oil and gas recovery operations and lift-ready flowhead assembly 1 could be deployed with other conventional or future developed lifting devices.

Figure 7:
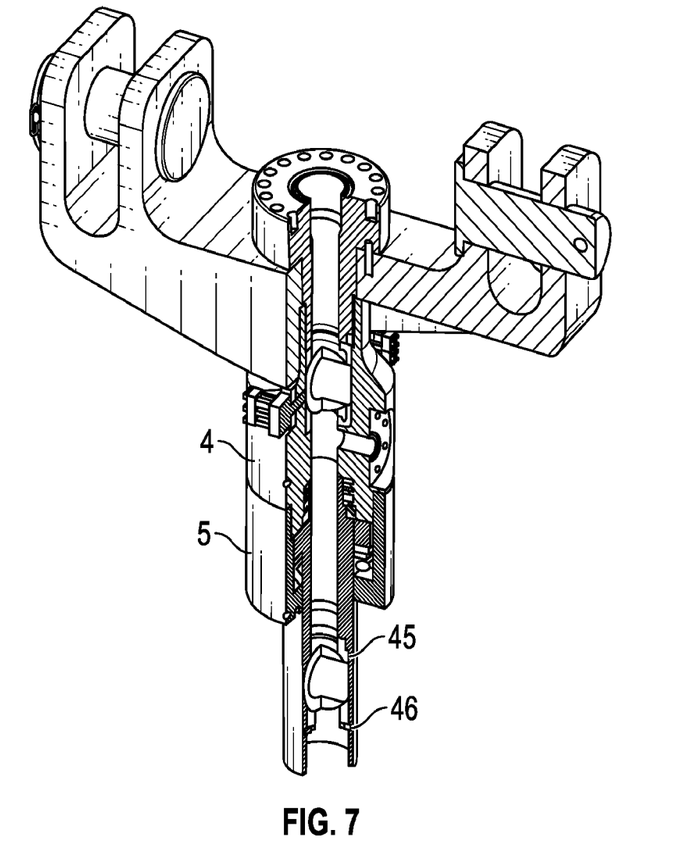
FIG. 7 is a partial cut-away view of a second embodiment of the lift-ready flowhead assembly.

Although the flowhead assembly 1 is not limited to any particular sizes or dimensions, the FIG. 1 embodiment does illustrate a distance or height "$h_1$" between the top of yoke body 22 and the bottom edge of swivel housing 5. In certain embodiments, this height "$h_1$" may be less than approximately 3' to 15' (i.e., less than any number in this range). Similarly, FIG. 4 illustrates a distance or height "$h_2$" between the top of the flowhead body neck portion 13 and the bottom edge of swivel housing 5. In certain embodiments, this height "$h_2$" may be between approximately 3' and 18' (or any sub-range in between). FIG. 7 illustrates an alternative where a second ball valve cartridge 45 is positioned within the central passage of the load collar tube. In this alternative, the first end of the load collar tube extending from the swivel housing 5 has a larger inner diameter than a second end of the load collar tube extending into the flowhead body 4. The second ball valve cartridge 45 is retained in the first end of the load collar tube with a split ring assembly 46.

Figure 8A:
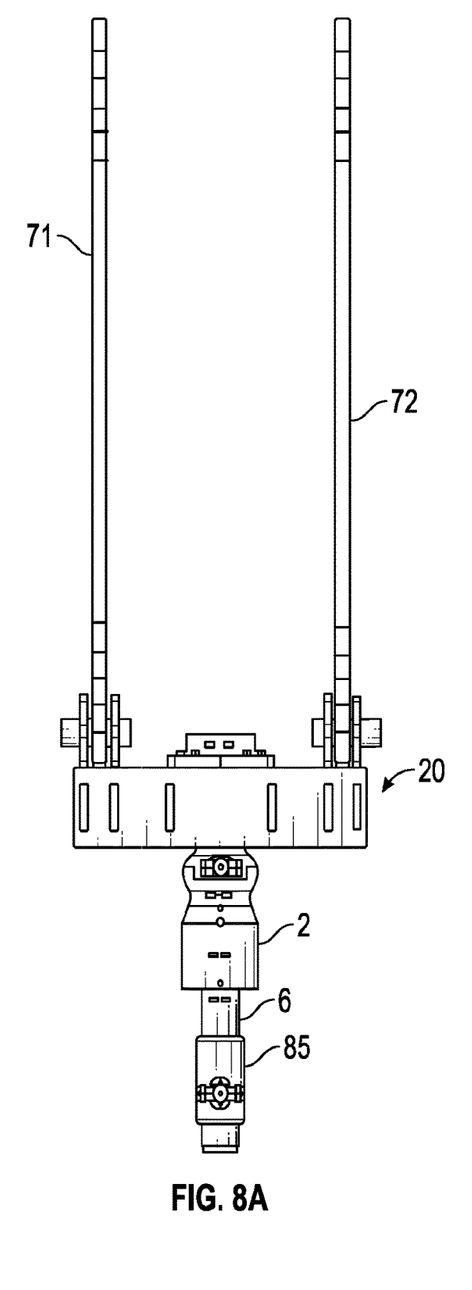
FIG. 8A is a planar view of a third embodiment of the lift-ready flowhead assembly connected to a lifting apparatus.
Figure 8B:
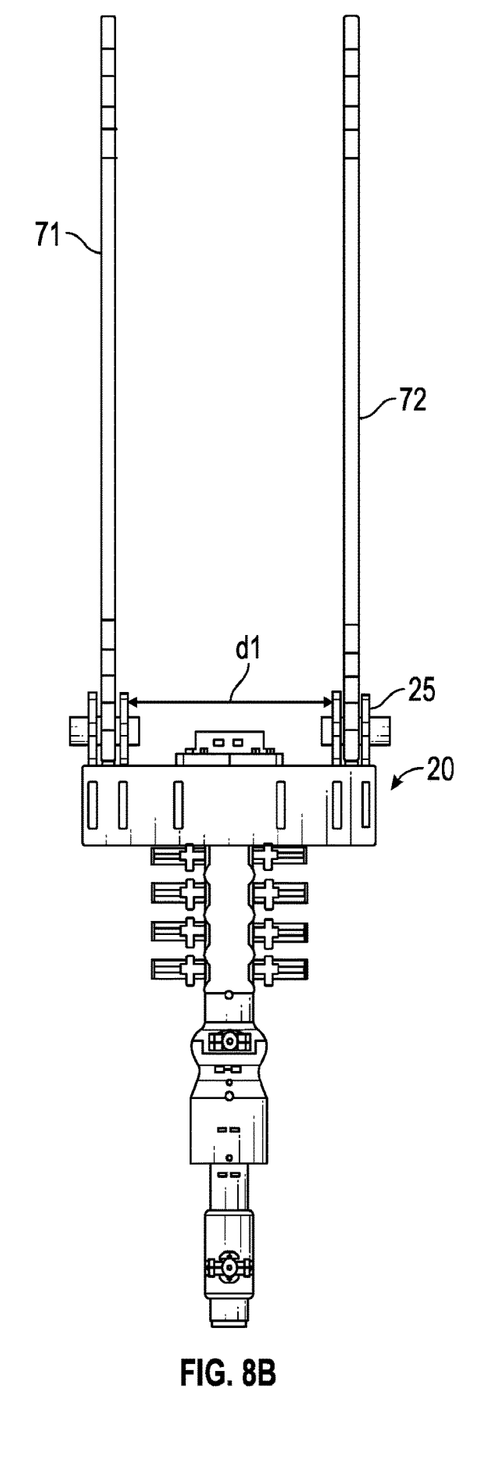
FIG. 8B is a planar view of the FIG. 8A embodiment of the lift-ready flowhead assembly connected to a lifting apparatus, but further including a blowout preventer.
Figure 9:
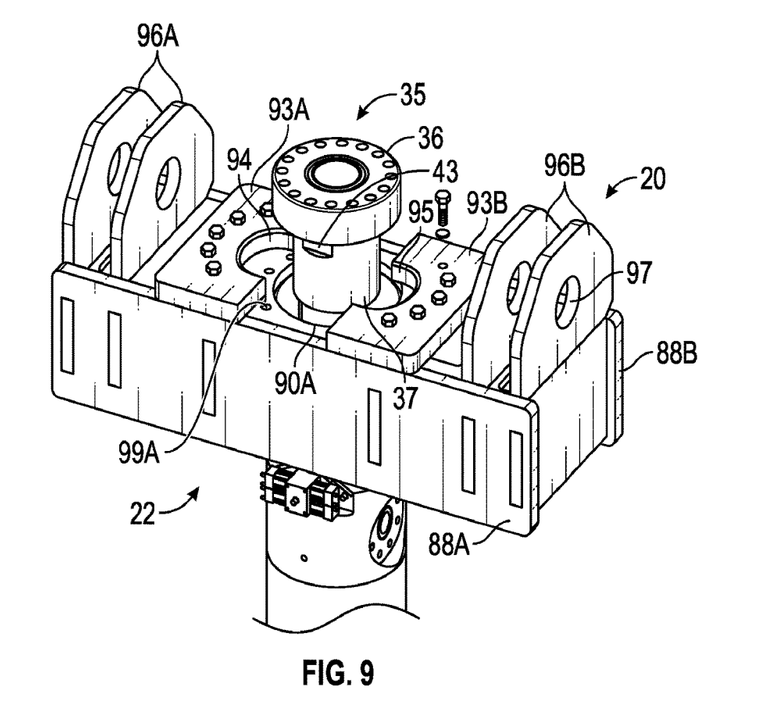
FIG. 9 is a perspective view of the lift sub head section passing through a further embodiment of a lifting yoke.
Figure 10:
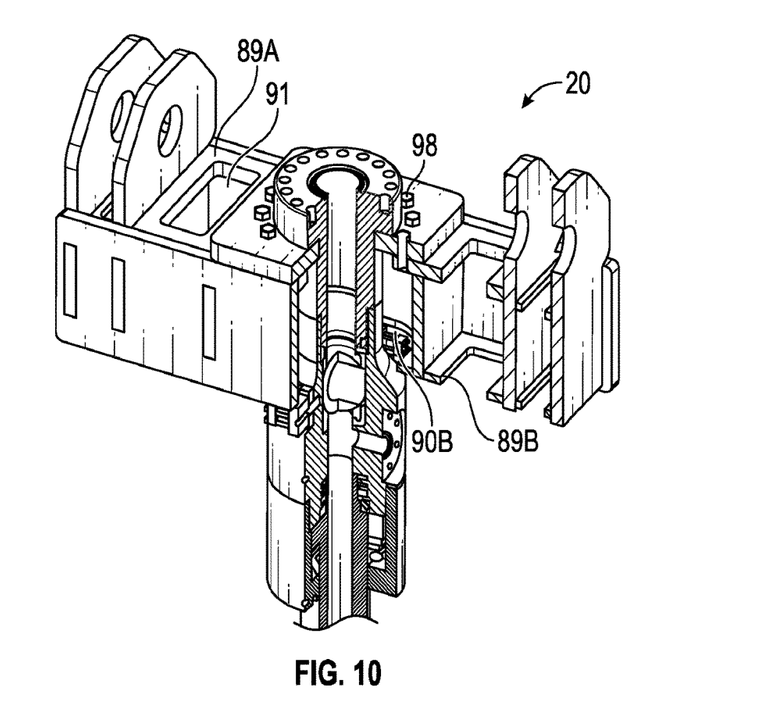
FIG. 10 is a partial sectional view of the FIG. 9 embodiment in an assembled state.

FIG. 8A illustrates another embodiment of the lift-ready flowhead assembly. This differs from the FIG. 1 embodiment in that an alternative lifting yoke 20 is used to suspend the flowhead assembly 2 from the bails 71 and 72. Additionally, FIG. 8A shows a second valve sub 85 attached to load collar tube 6. FIGS. 9 and 10 better show the details of this version of lifting yoke 20. The yoke body 22 is formed by the rectangular front plate 88A and rear plate 88B connected to top plate 89A and bottom plate 89B. In addition to weight saving cutouts 91, top plate 89A includes the center aperture 90A, while bottom plate 89B includes the center aperture 90B. It will be understood that the center apertures 90 have sufficient open area that head section 36 of lift sub 35 may pass through these center apertures. This open area may be referred to as a "diameter clearance," or the open area need to allow the diameter of the lift sub head section 36 to clear the center apertures 90. In one embodiment, the apertures 90 have a diameter clearance of at least 8¼" and typically no greater than 25½". Upturned ear plates 96A and 96B, having pin apertures 97, will be connected between the front and rear plates (and the top and bottom plates) in order to form pad-eyes similar to those seen in earlier embodiments. The aforementioned plates will be connected by welding or any other suitable conventional means. As shown in FIG. 8B, the distance "di" represents the distance between the inner faces of the pad-eyes 25 (similar to distance "d" in FIG. 3). In many embodiments, this distance di is between about 35" and about 100". However, the wider distances di, for example at least 50", have the advantage of providing room for workers to stand on the top plate 89A while positioning equipment on, and bolting to, lift sub head section 36. FIGS. 9 and 10 also show how block collars 93A and 93B will be used to retain lift sub 35 within lifting yoke 20. The block collars 93 will have a shaped (e.g., curved or arcuate) surface 94 that is configured to engage the lift sub's neck section 37. For example, the surface 94 can be configured to engage the neck section by having the same or a similar (e.g., up to 20% different) radius of curvature as the lift sub's neck section 37. FIG. 9 also shows how this embodiment of the block collars 93 will have anti-rotation surfaces 95 which are designed to mate with the anti-rotation surface 43 on neck section 37. In this example, the anti-rotation surfaces are flat segments on the curved face of the block collars 93 and corresponding flat segments 43 on the cylindrical surface of neck section 37.

Thus it can be seen how the block collars 93 have a first position (FIG. 9) allowing the lift sub head section 36 to pass through the center apertures 90, and a second position (FIG. 10) preventing the lift sub head section 36 from passing back through the center apertures. Although hidden from view in FIG. 9, it will be understood that there are a set of bolt apertures in top plate 89A which, when engaged by bolts 98, hold the block collars in the first position. Likewise, bolts 98 engaging another set of bolt apertures (seen as 99A in FIG. 9), are able to hold the block collars in the second position as suggested in FIG. 10. Although the Figures show two block collars 93, there could be embodiments with only one block collar or more than two block collars.

Figure 11:
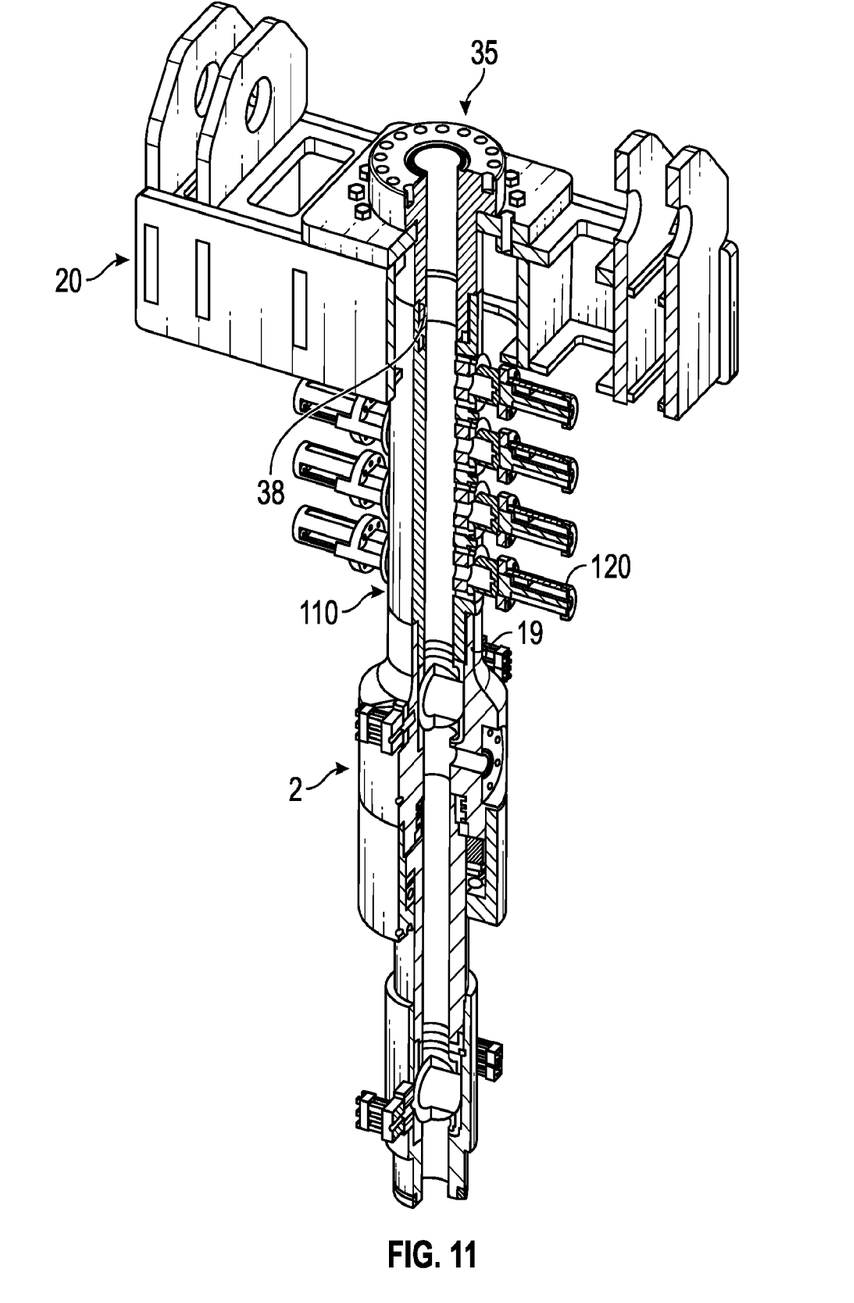
FIG. 11 is a partial section view of the FIG. 8B embodiment.
Figure 12:
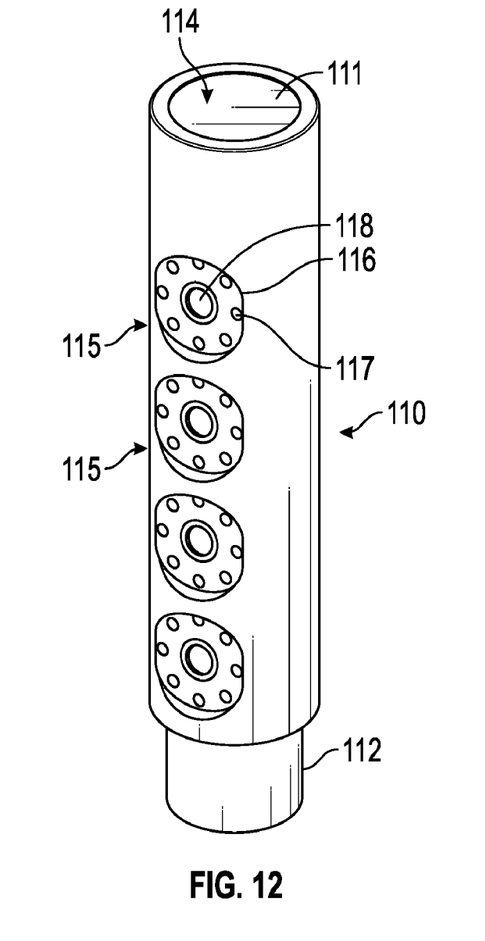
FIG. 12 is a perspective view of a side-flow sub with multiple pairs of opposing side entry ports.

Another embodiment of the invention in seen in FIGS. 8B, 11, and 12. FIG. 11 shows the previously described lifting yoke 20 connected to a side-flow sub 110 (via lift sub 35), which is in turn connected to flowhead assembly 2. FIG. 12 illustrates the side-flow sub 110 in more detail. Generally, side-flow sub 110 includes first end 111 formed with box threads (not specifically illustrated) and second end 112 formed with pin threads (also not specifically illustrated). A central flow passage 114 extends through the center of side-flow sub 110 and a series of side entry ports 115 are positioned along at least one side of sub 110. Although hidden from view in FIG. 12, it will be understood that each side entry port 115 seen in FIG. 12 has an opposing (i.e., offset 1800 around the circumference of sub 110) side entry port 115. Thus, side-flow sub 110 seen in FIG. 12 has four pairs of opposing side entry ports 115. The side entry ports include an inset 116 milled into the sub surface, bolt apertures 117, and a center aperture 118 that communicates with the sub central passage 114. Naturally, side-flow sub 110 could have fewer or more than four pairs of opposing side entry ports 115. Nor does a side entry port 115 necessarily need to have an opposing side entry port, e.g., there could be just a single side entry port along the entire length of the side-flow sub 110. In many embodiments, the side-flow sub 110 is designed or configured to support (i.e., not exceed some percentage of the yield point of the material forming the side-flow sub—e.g., 60% or 75% of the yield point) the load of the entire landing string or riser assembly which is attached below the side-flow sub. This typically means utilizing a material of sufficient strength (e.g., the particular grade of steel) and designing the tubular sub walls with sufficient thickness to provide the tensile strength and torsional strength required. In one embodiment, the side-flow sub is formed of a steel material and has a wall thickness sufficient to resist, without yielding, a tensile force of at least 250,000 lbs and a torsional force of at least 5,000 ft-lbs. In other embodiments, the steel material and wall thickness will be sufficient to resist a tensile force of between about 250,000 and about 5,000,000 lbs, and a torsional force between about 5,000 and about 50,000 ft-lbs.

Returning to FIG. 11, it can be seen that the lift sub neck threads 38 engage the box threads on the first end 111 of side-flow sub 110. Similarly, the pin threads on the second end 112 engage the flowhead neck threads 19. FIG. 11 also shows how side-flow sub 110 has rams 120 (e.g., pipe rams, blind rams, shear rams, or blind-shear rams) positioned on the side entry ports 115. In one example embodiment, the rams 120 are those sold under the tradename Cameron, by Variable Bore Rams Inc. of Broussard, LA, U.S.A. Those skilled in the art will recognize that the rams 120 turn side-flow sub 110 into a blowout preventer (BOP). However, the BOP configuration is merely one example and the side-flow sub 110 could take on any number of other functions.

Figure 13A:
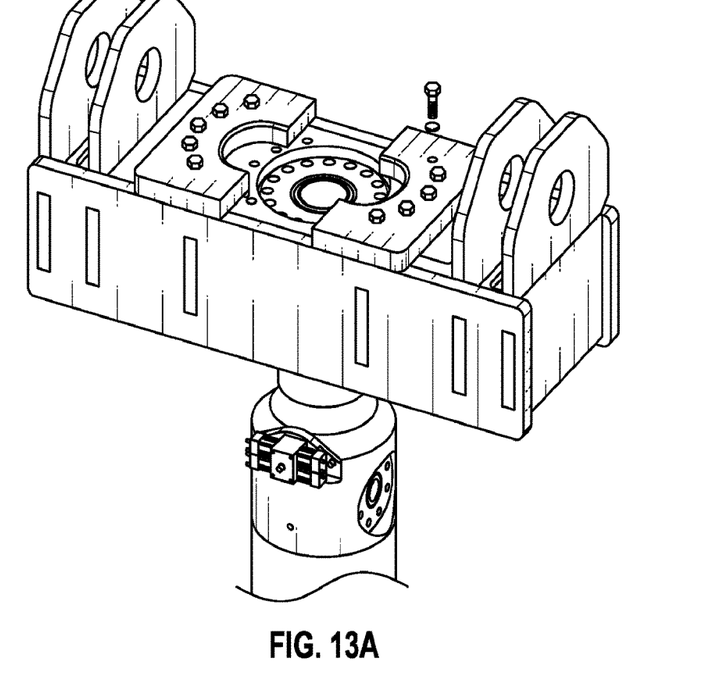
FIGS. 13A to 13C are an assembly sequence for the FIG. 8A flowhead assembly embodiment.
Figure 13B:
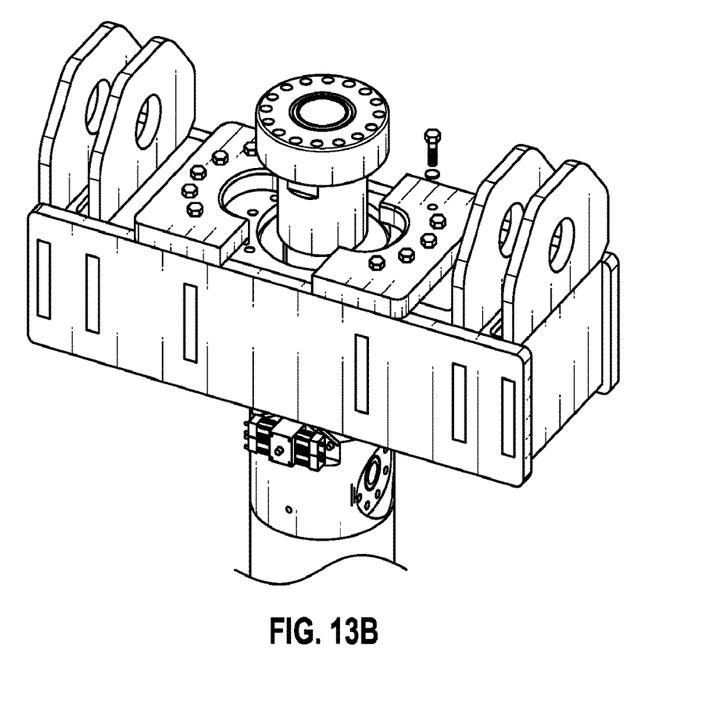
Figure 13C:
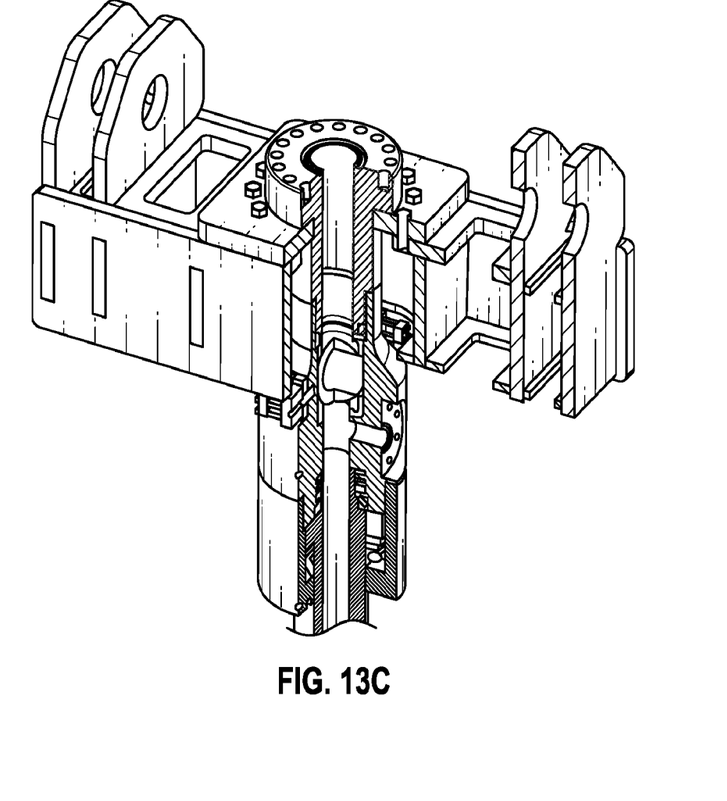

FIGS. 13A to 13C illustrate one method of assembling a lift-ready flowhead assembly such as seen in FIG. 8A. The method initially comprises the step providing a flowhead assembly 2 as described above (e.g., the FIG. 4 embodiment). Next, a lift sub 35 (e.g., such as seen in FIG. 10) is connected to the flowhead body. Then a lifting yoke 20 (e.g., such as seen in FIGS. 9 and 10) is provided. Next, as suggested in FIG. 13A, the head section 36 of the lift sub 35 is passed though the center apertures of the lifting yoke, when the block collars 93 are in the first or open position. When the head section 36 is lifted above the block collars as seen in FIG. 13B, the block collars are then placed in their second or closed position in order to fix the lift sub in the yoke body. Here, "fixing the lift sub in the yoke body" means head section 36 of the lift sub cannot pass back through the yoke center apertures.

The term "about" as used herein will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or possibly as much as +/−20%. Similarly, the term "substantially" will typically mean at least 85% to 99% of the characteristic modified by the term. For example, "substantially all" will mean at least 85%, at least 90%, or at least 95%.

Naturally, it will be understood that while the present invention has been described in terms of certain specific examples shown in the Figures, those skilled in the art will recognize many obvious modification and variations beyond these specific examples. All such modifications and variations are intended to fall within the scope of the following claims.

The invention claimed is:

1. A lift-ready flowhead assembly comprising:
   (a) a flowhead assembly including:
      (i) a flowhead body including body threads and a side entry port;
      (ii) a swivel housing;
      (iii) a load collar tube rotatively supported in the swivel housing by a bearing assembly;
      (iv) a ball valve positioned in said flowhead body and configured to block and unblock a central passage running through the load collar tube and the flowhead body;
   (b) a lift sub including:
      (i) a head section;
      (ii) a neck section having a cylindrical surface and external neck threads; wherein the external neck threads engage the body threads of the flowhead body;
      (iii) a sub passage extending through the head section and the neck section; and
   (c) a lifting yoke disposed around the neck section of the lift sub and interposed in position by the head section of the lift sub and the flowhead body, the lifting yoke including:
      (i) a yoke body having a center aperture, wherein the yoke body is formed without a side gate;
      (ii) opposing pad-eyes extending from the yoke body.

2. The lift-ready flowhead assembly according to claim 1, wherein the center aperture of the yoke body is sized to allow the lift sub head section to pass through the center aperture, wherein the lifting yoke further includes a pair of block collars configured to have (1) a first position allowing the lift sub head section to pass through the center aperture, and (2) a second position preventing the lift sub head section from passing through the center aperture, wherein the pair of block collars each have a curved face configured to engage the neck section of the lift sub.

3. The lift-ready flowhead assembly according to claim 2, wherein at least one of the pair of block collars has an anti-rotation surface configured to engage a corresponding surface on the neck section of the lift sub.

4. The lift-ready flowhead assembly according to claim 3, wherein (1) the anti-rotation surface of the block collar is a flat segment on the curved face of the block collar, and (2) the anti-rotation surface of the neck section is a flat segment on the cylindrical surface of the neck section.

5. The lift-ready flowhead assembly according to claim 1, wherein the yoke body is formed by rectangular front and rear plates connected to top and bottom plates, the top and bottom plates having the center aperture formed therethrough.

6. The lift-ready flowhead assembly according to claim 5, wherein the opposing pad-eyes are formed by upturned ear plates engaging the front and rear plates.

7. The lift-ready flowhead assembly according to claim 1, wherein the flowhead body further includes a blowout preventer, wherein the blowout preventer includes the body threads.

8. A method of suspending a flowhead assembly from a drilling rig including a hoisting assembly, the method comprising the steps of:
   (a) providing a lift-ready flowhead assembly comprising:
      (i) a flowhead assembly comprising: (1) a flowhead body including body threads and a side entry port; (2) a swivel housing; (3) a load collar tube rotatively supported in the swivel housing by a bearing assembly; and (4) a ball valve positioned in said flowhead body and configured to block and unblock a central passage running through the load collar tube and the flowhead body; and (ii) a lift sub including: (1) a head section; (2) a neck section having external neck threads, wherein the external neck threads engage the body threads of the flowhead body; (3) a sub passage extending through the head section and the neck section; and (iii) a lifting yoke disposed around the neck section of the lift sub and interposed in position by the head section of the lift sub and the flowhead body, the lifting yoke including: (1) a yoke body having a center aperture, wherein the yoke body is formed without a side gate; and (2) opposing pad-eyes extending from the yoke body;

(b) connecting the hoisting assembly to the pad-eyes on the yoke body.

9. The method of claim 8, wherein the distance between inner faces of the pad-eyes is between 35" and 100".

10. The method of claim 8, wherein the distance between inner faces of the pad-eyes is at least 50".

11. The method according to claim 8, wherein (i) the center aperture is sized to allow the lift sub head section to pass through the center aperture, wherein the lifting yoke further includes (ii) a pair of block collars configured to have (1) a first position allowing the lift sub head section to pass through the center aperture, and (2) a second position preventing the lift sub head section from passing through the center aperture.

12. The method according to claim 11, wherein the pair of block collars each has a curved face configured to engage the neck section of the lift sub.

13. A method of assembling a lift-ready side-flow sub comprising the steps of:

(a) providing a side-flow sub including a body including:
(i) at least one pair of opposing side entry ports and
(ii) a first threaded end;

(b) connecting a lift sub to the first threaded end of the side-flow sub, the lift sub including:
(i) a head section;
(ii) a neck section having external neck threads, wherein the external neck threads engage the body threads of the flowhead body;
(iii) a sub passage extending through the head section and the neck section;

(c) positioning a lifting yoke around the neck section of the lift sub, wherein the lifting yoke is interposed in position by the head section of the lift sub and the flowhead body, the lifting yoke including:
(i) a yoke body having a center aperture, wherein the yoke body is formed without a side gate;
(ii) opposing pad-eyes extending from the yoke body.

14. The method according to claim 13, wherein the center aperture of the yoke body is sized to allow the lift sub head section to pass through the center aperture, wherein the lifting yoke further includes a pair of block collars configured to have (1) a first position allowing the lift sub head section to pass through the center aperture, and (2) a second position preventing the lift sub head section from passing through the center aperture, wherein the pair of block collars each has a curved face configured to engage the neck section of the lift sub.

15. The method according to claim 14, wherein at least one of the pair of block collars has an anti-rotation surface configured to engage a corresponding surface on the neck section of the lift sub.

16. The method according to claim 15, wherein (1) the anti-rotation surface of the block collar is a flat segment on the curved face of the block collar, and (2) the anti-rotation surface of the neck section is a flat segment on the cylindrical surface of the neck section.

17. The method according to claim 13, wherein the yoke body is formed by rectangular front and rear plates connected to top and bottom plates, the top and bottom plates having the center aperture formed therethrough.

* * * * *